June 19, 1945. J. LOEWENSTEIN 2,378,566
SHIP CONSTRUCTION
Filed March 11, 1941 4 Sheets-Sheet 2
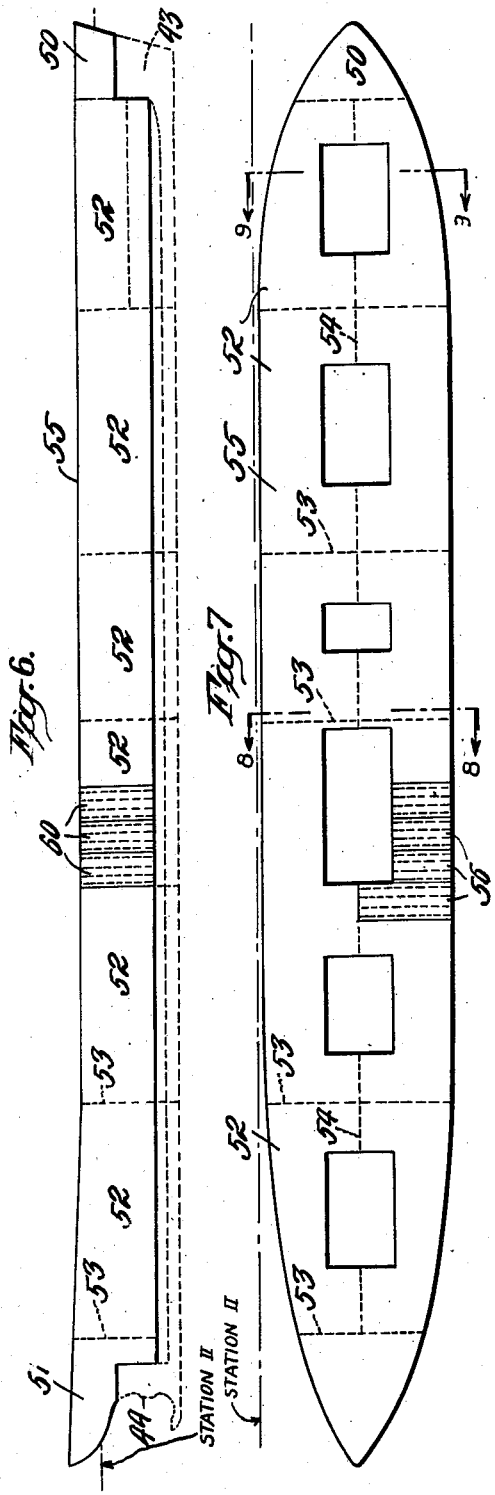
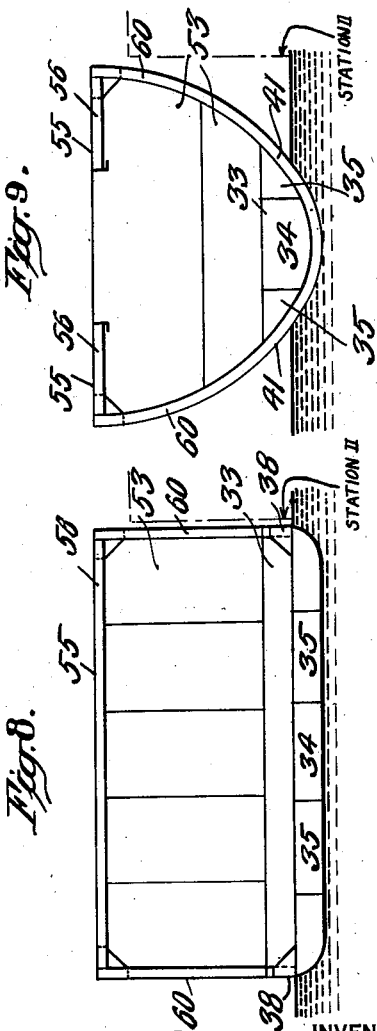

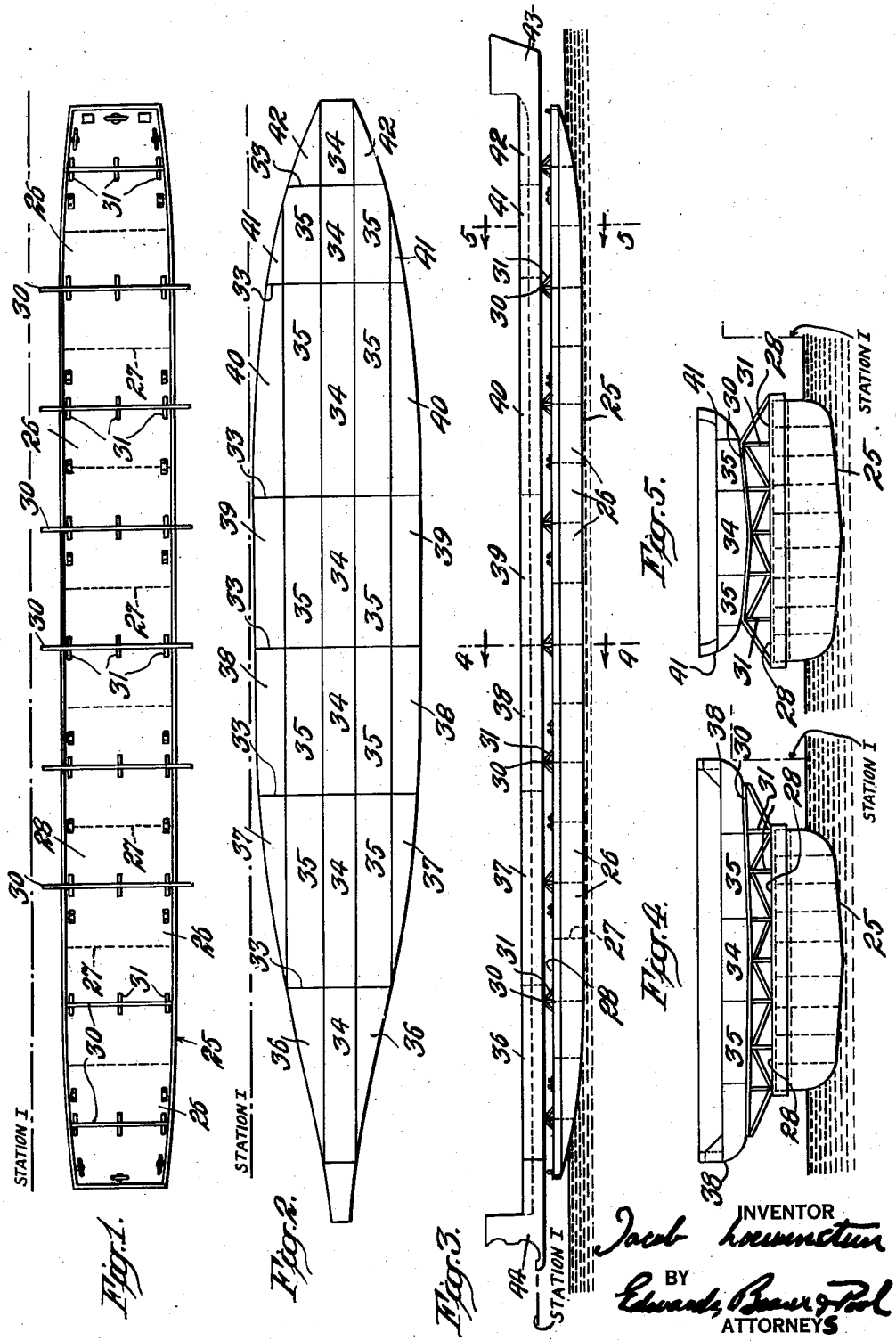

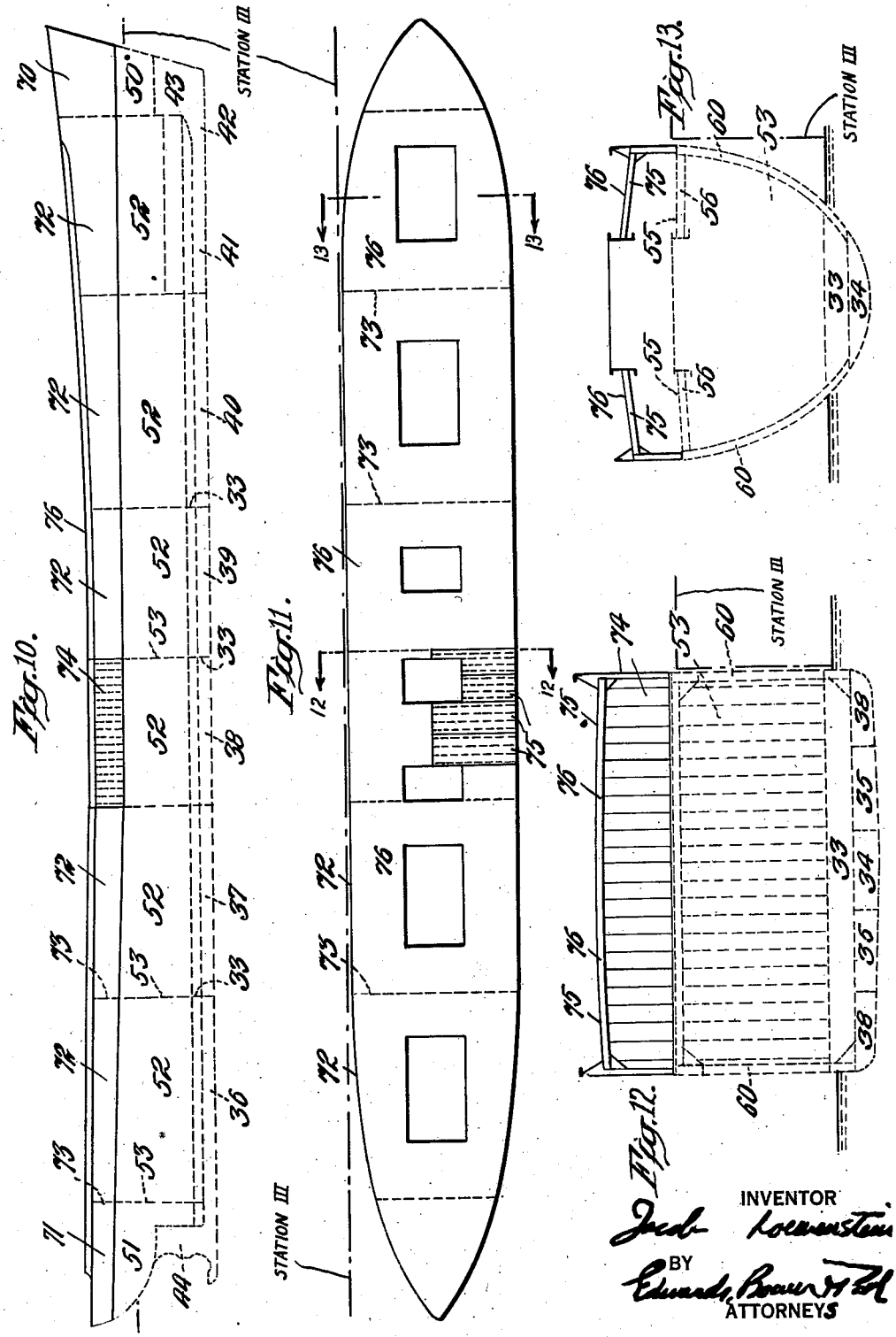

June 19, 1945. J. LOEWENSTEIN 2,378,566
SHIP CONSTRUCTION
Filed March 11, 1941 4 Sheets-Sheet 4

INVENTOR.
Jacob Loewenstein
BY
Edwards, Bruce Pool
ATTORNEYS

Patented June 19, 1945

2,378,566

UNITED STATES PATENT OFFICE 2,378,566

SHIP CONSTRUCTION

Jacob Loewenstein, New York, N. Y.

Application March 11, 1941, Serial No. 382,703

2 Claims. (Cl. 114—65)

This invention relates to a steel ship construction and the object of the invention is to provide a ship constructed by a continuous floating assembly method reducing the time and cost of building and producing a vessel of strong, seaworthy structure.

In the accompanying drawings illustrating the invention

Fig. 1 is a plan view of a floating barge structure at the first erecting station, the barge being shown in side view in Fig. 3;

Fig. 2 is a diagrammatic plan view of the body portion of the first section or stage of the ship construction shown in side view on the barge in Fig. 3;

Fig. 3 is a side elevation of a floating barge supporting the first section or stage of the ship construction at the first erecting station;

Fig. 4 is a vertical sectional view on enlarged scale taken on the line 4—4 of Fig. 3 and looking in the direction of the arrows;

Fig. 5 is a vertical sectional view taken on the line 5—5 of Fig. 3 and looking in the direction of the arrows;

Fig. 6 is a side view of the ship shown in plan view in Fig. 7 and illustrating the assembly of the first and second sections or stages of the ship construction at the second erecting station;

Fig. 7 is a plan view of the ship structure shown in Fig. 6;

Fig. 8 is a diagrammatic sectional view on enlarged scale in elevation taken on the line 8—8 of Fig. 7;

Fig. 9 is a diagrammatic sectional view on enlarged scale in elevation taken on the line 9—9 of Fig. 7;

Fig. 10 is a diagrammatic elevational side view of the ship body showing the first, second and part of the third stage assembly at the third erecting station;

Fig. 11 is a plan view of the ship structure shown in Fig. 10;

Fig. 12 is a diagrammatic sectional view on enlarged scale of the ship structure shown in Figs. 10 and 11 taken on line 12—12 of Fig. 11;

Figure 14:
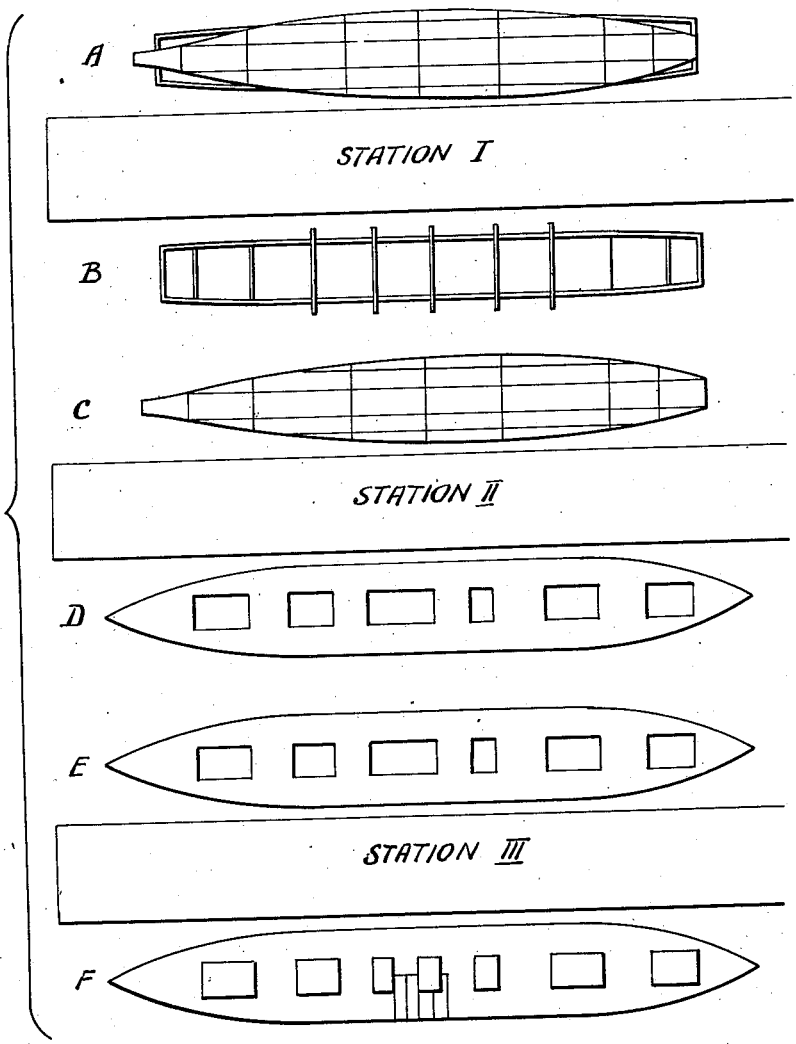
Figure 15:

Fig. 13 is a diagrammatic sectional view on enlarged scale in elevation of the ship structure shown in Figs. 10 and 11 taken on the line 13—13 of Fig. 11; and Figs. 14 and 15 are plan and elevational diagrams respectively showing a typical sequence of operations in the building of a vessel.

In the continuous floating assembly method illustrated in the drawings the ship is constructed in three stages. During the first stage the keel sections and the lower portions of the hull shell are provided preferably in prefabricated units which are fastened together on a framework supported on a floating barge or car float. At the end of this assembly the car float is preferably submerged and removed, the lowermost portion of the hull assembled in the first stage having been made watertight so as to float in position to receive the assembled units of the next stage. After completion of the next stage preferably from end to end the sections and units of the third or uppermost stage are assembled with the superstructure to complete the vessel hull and supported parts.

In Fig. 1 the floating barge or car float or tank arrangement 25 is formed in a series of sections 26 with transverse partitions 27 between them, and the deck 28 of the barge carries a series of transverse beams 30 blocked to the deck 28 by the members 31 (preferably of steel and fastened to the deck or tank) and adapted to support the first stage of the vessel construction as illustrated in Figs. 3, 4 and 5. The float referred to as a "floating barge" is positioned alongside of an erection derrick or derricks (not shown) mounted on a deck, pier, wall or shore designated Station I in Figs. 1 to 5 inclusive in position to deliver the keel and hull units throughout the length of the float, this derrick apparatus being of sufficient capacity to handle the heaviest keel sections.

The float 25 is of sufficient length to support the entire length of the first stage of the hull structure and is provided with watertight decks and watertight access manholes. Pumps or siphons (not shown) are provided on the dock or pier or shore alongside with flexible piping to pump water either into or out of the float or tank arrangement 25 and permit the tank to be submerged or floated with a controllable buoyancy sufficient to support the first stage of the ship during assembly.

The transverse beam structure 30 forms a false-work or cribbing on the float on which is erected the lowermost section or stage of the hull. Steel for this bottom part is prefabricated in units at separate fabricating plants and these large prefabricated units are set in place on the false-work or cribbing and on the previously assembled parts of the first stage of the hull by the derrick apparatus on the dock, pier, wall or shore. The derrick at the first erecting station will be moved along the float or the float will be moved back and forth under the derrick. The shaft and propeller (not shown) are set in place and the steel units forming the ship bottom are fitted up together and welded and after testing for watertightness are painted. The typical units are applied longitudinally between the bulkhead partitions 33. The center units 34 are illustrated in Fig. 2 varying in length from bulkhead to bulkhead and being formed of steel plating bent and welded to provide a generally rectangular hollow shell structure as shown. Similarly the adjacent units 35 are illustrated in Fig. 2 providing differently proportioned units of corresponding welded plating forming generally rectangular hollow shells of variable length between the bulkheads 33. The edge sections 36 to 42 on each side are specially built up of welded plate material in hollow shell-like units fitting the adjacent units and fastened to these units and together to form the outer bottom portion of the hull. The extreme end sections have attached to them the prow 43 and the rear rudder 44.

The completed lowermost hull section is then floated by filling the hold of the car float, barge or tank 25 sufficiently to submerge the vessel or hull section to a point where the hull will float. As the vessel section floats it is towed clear and the car float or barge is refloated by pumping or siphoning water out of the hole or by pumping water out of the tank, the float being then ready for the next hull.

A light duty derrick is provided on the dock, pier, wall or shore designated Station II alongside of which the completed lowermost section of the hull is floated as completed in the stage one just described. The steel fabrication units for the second deck are obtained from prefabrication plants preferably other than those working on the heavier units of stage one, and these prefabricating sections are set in place by moving the hull back and forth under the derrick, or if more desirable by moving the derrick along the hull. This hull of the second stage is shown in place in Figs. 7 to 9 and comprises the prow portion 50 and stern 51 and the successive hull sections 52 with the bulkheads 53 and the central partition structure 54, the upper surface being formed with the deck 55. The deck portions are preferably formed of prefabricated units 56 comprising a sheet portion to which on the under side are welded angle strips.

The side shells and bulkheads are preferably formed of prefabricated units 60 comprising a flat portion to which are welded a series of channels.

With the assembly of the various units the machinery and power plant equipment are erected in place, especially those parts which cannot be set after the steel work is in place. The steel sections and units are fitted up, welded, tested for watertightness and then painted, and the second stage of the hull formation is complete as shown in Figs. 9 to 12 inclusive.

For the third operation, preferably at another dock, pier, wall or shore designated Station III, a light duty derrick is provided alongside of which the section of the hull completed as to the first and second stages will float. The balance of the hull shell is then erected as illustrated in Figs. 10 to 13 inclusive. All steel units are prefabricated for this section, the hull or the derrick being moved back and forth to distribute the sections in their proper locations on the hull. This top section corresponding to the third stage of assembly comprises the bow portion 70 and the stern portion 71, and the intermediate sections 72 will have continuations 73 of the bulkheads 53 of the previous assembly. Preferably the vertical side shells and bulkheads 74 are formed of plate stock with angle bars welded to the inside thereof, and similarly the deck units 75 of the top deck 76 are formed of plates with channels welded to one surface thereof. The steel sections are fitted up, welded, tested for watertightness and then painted. This top section corresponding to the third stage of the assembly is then ready for the erection in place of all superstructure (not shown) and other finishing work. This superstructure will, of course, comprise the deck houses and quarters and control bridge structure to be erected in place on the deck 75.

All three stages of work can and preferably are going on simultaneously on successive vessels as diagrammed in Figs. 14 and 15, the first or keel section being floated to a second dock, pier, wall or shore and when completed then is floated to a third location for the final stage of operations.

This method divides the construction of each vessel into three stages to accommodate the type of fabrication involved and the equipment necessary for erection. Stage one shown in Figs. 1 to 5 and at Station I in Figs. 14 and 15 consists of heavy massive fabricated pieces all of which would be handled by shops and equipment accustomed to similar heavy work. Stage two shown in Figs. 6 to 9 and at Station II in Figs. 14 and 15 comprises relatively light sections and will be handled preferably by other shops and equipment adapted to this much lighter work. Stage three shown in Figs. 10 to 13 and at Station III of Figs. 14 and 15 comprises light sections and will be handled by other shops and equipment intended for this lighter type of work. Speed is attained by separately using light equipment and light fabrication facilities for light work and heavy for heavy work and in not attempting to mix the light and heavy work.

In Figs. 14 and 15 a barge carrying a lowermost portion of the hull is shown at A and a barge ready to receive the construction of a lowermost portion at B, these being on opposite sides of Station I. At Station II the freshly completed lowermost portion is shown at C and the hull with the second portion completed is shown at D, and at Station III the hull with the two lower portions completed is shown at E and with the completed three portions at F.

This continuous floating assembly method does not require shipyards, shipways, drydocks, or other special costly facilities; nor does it require shipyard fabrication facilities. Any available floating means or fabrication facilities may be used. As many assemblies as desired can be undertaken at either one or several points and calculation indicates that each single assembly set-up with one shift will accomplish the construction of about one hull in two weeks so that added assembly set-ups will result in the completion of hulls at a very rapid rate due to the simultaneous and continuous use of all the facilities; increasing the number of shifts will of course further reduce the time of construction.

In avoiding expenditure of large sums for construction of shipyards, drydocks, etc., and in saving in steel and time and in utilizing available equipment, this method of construction not only shortens time of completion of the units but also enables them to be finished at less cost.

I claim:

1. A method of building ships comprising the steps of erecting the lowermost portion of a ship's hull on a floating barge positioned alongside a first erecting station on the shore of a body of water, said erecting station being provided with the necessary equipment for construction of said hull portion, said hull portion having sufficient buoyancy to float, sinking said barge and thereby launching said lowermost hull portion, floating said hull portion alongside a second erecting station on the shore of the body of water, said second station being provided with the necessary equipment for adding an upper portion of the hull to said lowermost hull portion, erecting on said lowermost hull portion while floating alongside said second station the upper hull portion to thereby complete said upper portion of the hull, refloating said barge to make it available for erection of another lowermost hull portion thereon and repeating the operations in sequence whereby to substantially continuously employ the erecting stations and equipment.

2. A method of building ships comprising the steps of erecting the lowermost portion of a ship's hull on a floating barge positioned alongside a first erecting zone on the shore of a body of water, said erecting zone being provided with the necessary equipment for construction of said hull portion, said hull portion having sufficient buoyancy to float, sinking said barge and thereby launching said lowermost hull portion, floating said hull portion alongside a second erecting zone on the shore of the body of water, said second zone being provided with the necessary equipment for adding an upper portion of the hull to said lowermost hull portion, erecting on said lowermost hull portion while floating alongside said second zone the upper hull portion to thereby complete said upper portion of the hull, refloating said barge to make it available for erection of another lowermost hull portion thereon and repeating the operations in sequence whereby to substantially continuously employ the erecting zones and equipment.

JACOB LOWENSTEIN.